Patented Sept. 26, 1933

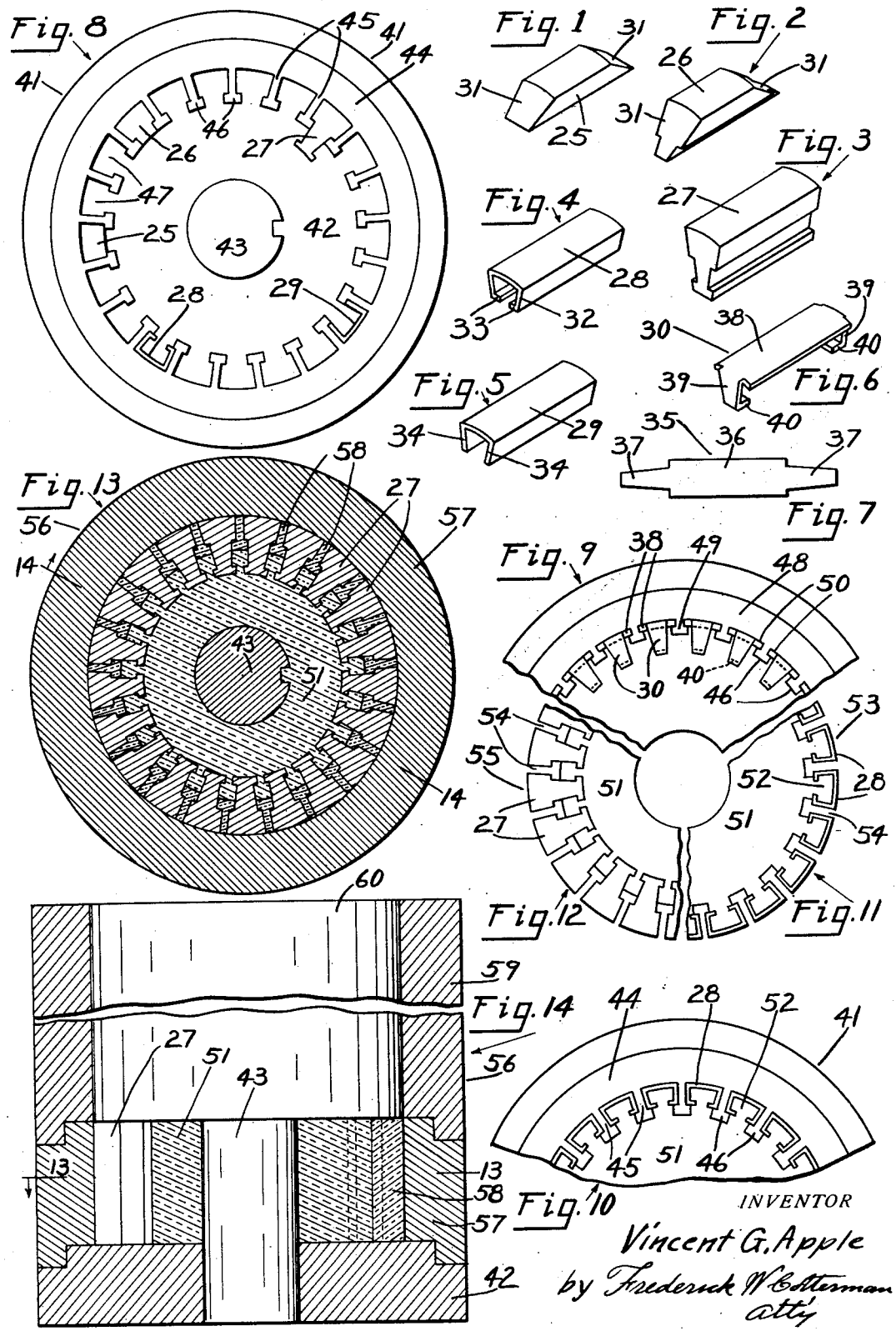

1,928,325

UNITED STATES PATENT OFFICE 1,928,325

MOLD FOR MAKING COMMUTATORS

Vincent G. Apple, Dayton, Ohio; Herbert F. Apple, Edward M. Apple and Gourley Darroch executors of said Vincent G. Apple, deceased Original application July 26, 1929, Serial No. 381,360. Divided and this application January 15, 1932. Serial No. 586,883

4 Claims. (Cl. 18—42)

This invention is a division of my copending application Serial Number 381,360, now Patent Number 1,845,115, issued February 16th, 1932, and relates to a mold for making commutators and particularly to that class of commutators wherein a plurality of segments of material having a high degree of electrical conductivity are bound together in spaced apart relation by a core of insulation molded in situ between and about them.

To provide commutators of this class suitable for high rotative speed the core material must possess considerable mechanical as well as dielectric strength, and a certain class of phenol-resin molding compounds meet this requirement and are therefore often used for this purpose.

But when cores made from these strong materials extend outwardly between the metal segments and form a part of the brush track of the commutator, difficulty is encountered, since these materials do not make a good brush track because arcing of the brushes converts them to carbon which is a conductor, and thereby adjacent segments are electrially joined.

To overcome this objection commutators of this class are usually undercut, i. e. the core material is cut from between the segments at the brush track, or sometimes spacers of sheet insulating material more nearly suited to a brush track are placed between the segments near the periphery of the commutator, and the core is then molded to extend outwardly between the segments until met and excluded by these spacers.

It is therefore an object of this invention to produce a commutator in which these objections are not present, by providing apparatus and a procedure which contemplates employing one kind of insulation for the core and another kind for the spacers which separate the segments at their outer edges adjacent the brush track, each kind being determined by its adaptability to its particular function, and placing each where its particular kind is needed.

Since some materials which are highly suitable for the segment spacers lack the necessary adhesive properties to keep them secured against radially outward movement during rotation of the commutator, it is a further object of the invention to provide apparatus to facilitate securing the spacers in place.

Other objects and meritorious features of the invention will become apparent, to one skilled in the art of commutator making, from a consideration of the following description taken in conjunction with the drawing, wherein—

Figs. 1 to 6 are perspective views of different forms of segments, either of which is suitable for making a commutator embodying my invention.

Fig. 7 is an outline of the blank from which the segment shown in Fig. 6 is made.

Fig. 8 is a plan view of the mold with the stock ring and the plunger removed to more clearly show the means for holding a plurality of segments, of either of the kinds shown in Figs. 1 to 5, in spaced apart relation while a core of insulation is molded in place.

Fig. 9 is a fragmentary plan view of another mold similar to that shown in Fig. 15 but modified to hold a set of segments Fig. 6.

Fig. 10 is a fragmentary view of the mold Fig. 8 with segments Fig. 4 in place between the spacing means of the mold, and a core of insulation molded to hold the segments in spaced relation after the structure is removed from the mold.

Fig. 11 shows the commutator structure as it appears after removal from the mold in which it appear in Fig. 10.

Fig. 12 shows a commutator structure similar to that shown in Fig. 11 except that it is composed of segments Fig. 3 instead of segments Fig. 4.

Fig. 13 is a transverse section through a second mold similar to that shown in Fig. 8 except that the segments spacing means are omitted.

Fig. 14 is a vertical axial section through the second mold taken at 14—14 of Fig. 13.

Similar numerals refer to similar parts throughout the several views.

Segments 25, 26 or 27 are preferably made by providing bar stock or wire of the cross section shown and cutting it into lengths. The segments 25 and 26, having no grooves or other means along their sides which a core may engage to hold them together are preferably cut diagonally at the ends as at 31. The core of insulation may then be molded about these diagonal ends to hold the segments against radially outward movement when the commutator rotates.

The segments 28, 29 and 30 are preferably made from flat sheet stock, the segment 28 by providing a strip of sheet metal of suitable length and bending it downward as at 32 and the edge inward as at 33, the segment 29 by bending a strip of sheet metal of suitable length downward only as at 34, and the segment 30 by cutting out a sheet metal blank of the outline 35, Fig. 7, having a wide portion 36 and narrower prongs 37, and curving the part 36 to the commutator radius as at 38, Fig. 6, and bending the prongs 37 downward as at 39 and inward as at 40.

The molding apparatus 41, Fig. 8, comprises a base 42 having a removable pilot 43 concentrically supported therein and a spacing ring 44 held in concentric relation to the pilot 43. Ring 44 has a plurality of spacing tangs 45 extending inwardly from its inner wall. These tangs have T-shaped ends 46, which leaves a series of pockets 47 between the tangs. A pocket 47 is adapted to receive either one of the segments 25 to 29 and one of each of these segments is shown in a pocket, though of course when actually filling the mold with segments, preparatory to molding the core, all of one kind of segments are used and each one and every pocket is filled.

The fragmentary view Fig. 9 shows a modified spacing ring 48 which has shorter spacing tangs 49 with the same T-shaped heads 46. This modification provides pockets 50 of lesser radial depth which adapts this ring to hold the segments 30, with which the pockets are filled.

By consideration of Fig. 9 the advantages of the T-shaped mold tangs is obvious, for, if plain tangs 49 without the T-heads 46 were used, considerable difficulty would be encountered in keeping the segments 30 against the outer wall of the mold until a core could be molded within them to hold them permanently. Of course the principal function of the T-shaped tang in the mold is to produce a T-shaped slot in the core of insulation wherein another kind of insulation may afterward be molded and held against radially outward movement, and this function could of course be accomplished with mold tangs of L shape, or of otherwise modified form, so long as there was an enlargement of some sort at the inner end of each tang.

Fig. 10 is a fragmentary view of the same mold 41 as is shown in Fig. 8 but with the pockets filled with segments 28, and a core of insulation 51 molded to extend outwardly into the interior of segments 28 as at 52 to tie them to the core.

When the structure produced in the mold 41 is removed therefrom it appears as at 53 Fig. 11, the segment 28 being held by portions 52 of core 51, leaving T-slots 54 between the segments. The structure 55, Fig. 12 is produced in the same manner as the structure 53 except that segments 27 instead of segments 28 are used.

The mold 56, Figs. 13 and 14 has the same base 42 and pilot 43 as the mold 41, Fig. 8, but a smooth bored ring 57 is substituted for the spacing ring 44 of the mold 41. This mold is adapted to receive the structure 55 Fig. 12 which is composed of segments 27 held together with the core 51 of the one kind of insulation and with the T-slots 54 between the segments, and hold it until the other kind of insulation 58 is forced into the T-slots as shown.

Fig. 14 shows a stock ring 59 on the ring 57 of mold 56, and a plunger 60 which has been forced downward to drive the insulation 58 into the T-slots. The same base 42, pilot 43, stock ring 59 and plunger 60 are used in both molds 41 and 56, the only difference in the two molds being in the substitution of the smooth bored ring 57 for the spacing ring 44.

In operation the base 42, the pilot 43 and the spacing ring 44 are assembled, the segment is put into each of the pockets 47 of the spacing ring, the stock ring 59 is put in place, a determined quantity of unmolded insulation of the one kind is put into the stock ring and forced downward around the segments to compose the core. Spacing ring 44 is then removed and smooth ring 57 substituted, a determined quantity of the other kind of insulation is put into the stock ring and forced into the T-slots by plunger 60.

When the foregoing procedure is followed the commutator will have a core sufficiently strong to hold the segments against radially outward movement at all reasonable rotative speeds and may have spacers between the segments at the brush track of soft material possessing very little strength, and such spacers will be locked in place by the T-heads at their inner edges.

Having described my invention, I claim,

1. Apparatus for making commutators, comprising a mold ring having an inner diameter corresponding to the outer diameter of the commutator, a series of spacing tangs extending radially inward from the wall of said mold ring forming pockets within which the segments may be located to hold them circumferentially spaced, said tangs having enlarged inner ends adapted to engage edges of the segments to hold them against radially inward movement, and means to compress a core of insulation about portions of said segments not in contact with said tangs.

2. The apparatus defined in claim 1 having a base fitted to the one side of said mold ring and a stock ring fitted to the other and a plunger slidably fitted to said stock ring.

3. The apparatus defined in claim 1 having a base with a center plug corresponding to the shaft opening in the commutator concentrically supported on one side of said mold ring, a stock ring concentrically supported on the other side of said mold ring, and a second mold ring like and interchangeable with the first mold ring but not having the said spacing tangs.

4. The apparatus defined in claim 1 in which the spacing tangs having the enlarged inner ends are each in the form of a T with the head of the T extending inwardly.

VINCENT G. APPLE.